(12) United States Patent
Kubota et al.

(10) Patent No.: US 8,490,590 B2
(45) Date of Patent: Jul. 23, 2013

(54) HYDRAULIC LASH ADJUSTER FOR INTERNAL COMBUSTION ENGINE

(75) Inventors: Yukio Kubota, Hadano (JP); Akifumi Tanaka, Hadano (JP)

(73) Assignee: Nittan Valve Co., Ltd., Hadano-shi (JP)

( * ) Notice: Subject to any disclaimer, the term of this patent is extended or adjusted under 35 U.S.C. 154(b) by 68 days.

(21) Appl. No.: 13/256,587

(22) PCT Filed: Jun. 10, 2009

(86) PCT No.: PCT/JP2009/060610
§ 371 (c)(1),
(2), (4) Date: Oct. 31, 2011

(87) PCT Pub. No.: WO2010/143284
PCT Pub. Date: Dec. 16, 2010

(65) Prior Publication Data
US 2012/0042843 A1 Feb. 23, 2012

(51) Int. Cl.
*F01L 1/14* (2006.01)
(52) U.S. Cl.
USPC .......... 123/90.55; 123/90.45; 123/90.46; 123/90.52; 74/569
(58) Field of Classification Search
USPC ........ 123/90.45, 90.46, 90.52, 90.55; 74/567, 74/569
See application file for complete search history.

(56) References Cited

U.S. PATENT DOCUMENTS
7,685,984 B2 * 3/2010 Hendriksma et al. ...... 123/90.48

FOREIGN PATENT DOCUMENTS

| JP | 57-176502 U | 6/1984 |
| JP | 61-073401 U | 5/1986 |
| JP | 61-073399 U | 11/1987 |
| JP | 6-173622 A | 6/1994 |
| JP | 2005-002953 A | 1/2005 |
| JP | 2009-047127 A | 3/2009 |

OTHER PUBLICATIONS

International Search Report of PCT/JP2009/060610, mailing date Aug. 11, 2009.

* cited by examiner

*Primary Examiner* — Ching Chang
(74) *Attorney, Agent, or Firm* — Westerman, Hattori, Daniels & Adrian, LLP

(57) ABSTRACT

A hydraulic lash adjuster capable of retaining a Large amount of hydraulic oil in a reservoir communicated with a high-pressure chamber when the engine is stopped. The hydraulic lash adjuster including: a cylindrical body (24) having an upper open end, a closed bottom, and a second oil supply hole (27a) formed in the sidewall of the cylindrical body; and a plunger having a top end serving as a plunging end, a sidewall, a bottom end, a high pressure chamber (29) at the lower bottom, and a first oil supply hole (24b) formed in the sidewall, the plunger being slidabic on the inner wall of the body. The plunger has a reservoir (28) that communicates with an external oil supply line (32) via the first oil supply hole (24b) and the second oil supply hole (27a).

5 Claims, 14 Drawing Sheets (a)

(b)

(a)

(b)

HYDRAULIC LASH ADJUSTER FOR INTERNAL COMBUSTION ENGINE

FIELD OF THE INVENTION

This invention relates to a hydraulic lash adjuster for automatically compensating for the valve gap of a valve actuation mechanism of an internal combustion engine, and more particularly, the invention relates to a hydraulic lash adjuster capable of retaining a large amount of hydraulic oil in a reservoir in communication with a high pressure chamber provided in the hydraulic lash adjuster when the engine is stopped.

BACKGROUND ART

A valve actuation mechanism of an internal combustion engine is in general liable to wear and/or thermal distortion that change valve gaps of the valve actuation mechanism in operation. To properly compensate for such change in valve gap, a hydraulic lash adjuster may be used.

FIG. 19 shows a conventional hydraulic lash adjuster, which has a body 2 (hereinafter referred to as adjuster body 2) mounted in a mounting bore 30 formed in a cylinder head 10 of the engine. The adjuster body 2 comprises a body 24 fitted in the mounting bore 30 and a plunger 26 mounted in the body 24 so that the plunger is slidable in the upward and downward directions. There is formed in the plunger 26 a reservoir 28, which communicates with an oil gallery 32 that faces the mounting bore 30 through a small hole 24b, formed in the body 24. The reservoir 28 also communicates with a high pressure chamber 29 via a small hole 27b formed in the reservoir 28. During operation, the reservoir 28 and the high pressure chamber 29 are filled with hydraulic oil supplied from the oil gallery 32. Reference numerals 14, 16 and 17 respectively indicate a valve member, a cam, and a rocker arm which together constitute the valve actuation mechanism. When a pressure is applied to the hydraulic oil, a check ball 25a disposed in the high pressure chamber 29 closes the small hole 27b to lock the plunger 26 with its top end adapted to serve as a fulcrum of the rocker arm 17. As the cam nose 16a of the cam 16 pushes the rocker arm 17 downward, the rocker arm 17 in turn pushes down the valve member 14 against the force of a spring 15, and opens the air passage 12 associated therewith. As the cam 16 rotates, the valve member 14 is returned to its close position by the action of the spring 15. A plunger spring 23 keeps the plunger 26 in abutting contact with the rocker arm 17 at all times, thereby compensating for the gap between them caused by thermal deformations that occur in the valve actuation mechanism during operation.

Installed in the reservoir 28 is a cylindrical body 6, which partitions the reservoir 28 into an inner chamber 28a communicated with a high pressure chamber 29 and an outer chamber 28b communicated with a small hole 27a serving as an oil supply hole. It is noted that during operation the oil level in the inner chamber 28a is kept up to the level H1 in the reservoir communicated with the high pressure chamber 29 as shown in the FIG. 19 even when the adjuster body 2 is installed inclined, so that the reservoir can store a large amount of oil therein and adequately prevent air from being induced from the reservoir into the high pressure chamber 29 when the engine is stopped once and restarted.

That is, were it not for the inner chamber 28a, the oil level in the reservoir 28 would become as low as level H2 (FIG. 19) of the oil supply passage 27a when the engine is stopped. Hence, at the time of restarting the engine, the air staying above the oil surface would be sucked into the high pressure chamber 29 together with the hydraulic oil sucked from the reservoir 28 into the high pressure chamber 29. Particularly, when the engine is stopped with the cam nose 16a sitting on the rocker arm 17, the plunger 26 is held at the lowest (bottom) position. If the engine is restarted under such condition, the plunger 26 undergoes a maximum possible stroke in the body 24, so that the maximum amount of the hydraulic oil could be drawn into the high pressure chamber 29. In actuality, however, since no hydraulic oil is supplied from the engine to the reservoir 28 while the engine is stopped, it is almost impossible then to secure a sufficient amount of oil in the reservoir 28. As a consequence, a violent air suction phenomenon takes place when the engine is restarted. Should air be drawn in the high pressure chamber 29, the hardness of the hydraulic oil in the high pressure chamber 29 is extremely reduced (so that the hydraulic oil becomes a sponge-like material) when the plunger 26 is pressed down. This disenables proper compensation of the valve gap by the plunger. In contrast, in the valve actuation mechanism shown in FIG. 19, a large amount of oil is secured (as high as oil level H1) in the inner chamber 28a of the reservoir 28 when the engine is stopped that air suction into the high pressure chamber 29 at the time of restarting the engine is prevented.

PRIOR ART DOCUMENT

Patent Document

Patent Document 1: JPA H6-173622

SUMMARY OF THE INVENTION

Problems to be Solved by the Invention

It is noted, however, that since the prior art reservoir of Patent Document 1 the cylindrical body 6 is disposed in the reservoir 28, the amount of oil in the reservoir 28 can be at most the total amount of oil in the cylindrical body 6 after stopping the engine.

In a case where the cylindrical body 6 is not accommodated in the reservoir 28, so-called oil re-circulation phenomena (referred to leak-down phenomena) take place during operation of the engine in which the hydraulic oil is re-circulated or recycled from the high pressure chamber 29 to the reservoir 28 (communicated with the high pressure chamber 29) through a gap between the plunger 26 and the body 24 and through the small oil supply hole 27a, thereby facilitating securement of oil in the reservoir 28 when the engine is stopped. However, in the apparatus of Patent Document 1, recirculation of the leak-down oil is not performed, since the cylinder 6 is installed in the reservoir 28. Accordingly, the amount of hydraulic oil in the reservoir 28 at the time of stopping the engine will be less by the re-circulated oil.

In short, the prior art lash adjuster still suffers a problem that the reservoir 28 cannot retain a sufficient amount of hydraulic oil to prevent air suction into the high pressure chamber 29 when the engine is restarted.

In view of such problem, the inventors of the present invention exclude the cylindrical body 6 in the reservoir 28, and instead provide an annular communication passage for communicating the oil supply hole 27a formed in the sidewall of the plunger 26 with an oil supply hole 24b formed in the sidewall of the body 24, along with a check valve in the form of a leaf spring to be placed in the annular communication passage in abutting contact with the inner surface of the sidewall of the body 24, for closing the oil supply hole 24b formed in the inner circumferential wall of the body 24 such that, during operation, the check valve can be pushed open by the pressurized hydraulic oil supplied from the oil gallery 32. Thus, during operation, the pressurized hydraulic oil is induced from the open oil supply hole or holes 24b to the reservoir 28. In this arrangement leak-down oil 4 is recycled, and the oil supply hole 24b is closed when the engine is stopped, thereby retaining a large amount of oil in the reservoir 28 to the level of the open end of the body 2. Thus, this arrangement can circumvent the prior art problem that air is drawn into the high pressure chamber when the engine is restarted.

It has been shown in preliminary tests that an inventive lash adjuster equipped with such check valve as described above can effectively solve the problem. The inventors are thus determined to file an application for patent for the lash adjuster.

It is an object of the present invention to provide a hydraulic lash adjuster that can retain a sufficient amount of hydraulic oil in the reservoir communicated with a high pressure chamber even when the internal combustion engine is stopped.

Means for Solving the Problem

To achieve the object above, there is provided in accordance with the present invention a hydraulic lash adjuster for an internal combustion engine, as defined in claim 1, the hydraulic lash adjuster including: a cylindrical body having an open upper end, a closed bottom, and a second oil supply hole formed in the sidewall of the cylindrical body; and a plunger having an upper end serving as a plunging end, a sidewall having a first oil supply hole, and a high pressure chamber at the bottom thereof, the plunger being slidable on the inner wall of the body and provided with a reservoir communicated with an external oil supply line via the first oil supply hole of the plunger and via the second oil supply hole of the body, and provided with a small hole for communicating the reservoir with the high pressure chamber, the high pressure chamber including a check ball adapted to open/close the small hole in response to a rise and a fall of the oil pressure in the high pressure chamber, and including a spring for urging the plunger in the longitudinal direction of the plunger, the hydraulic lash adjuster characterized in that:

the first and second oil supply holes are communicated with each other through an annular communication passage formed between the sidewalls of the plunger and the body; and a check valve is provided in the annular communication passage in association with the second oil supply hole, the check valve adapted to open/close the second oil supply hole in accordance with the pressure of the oil supplied from an external oil supply line to the second oil supply hole.

(Function)

The hydraulic oil (engine oil) is introduced from an external oil gallery or oil passage formed in the cylinder head of the engine into the reservoir of the plunger through the second oil supply hole, annular communication passage between the sidewalls of the body and the plunger, and the first oil supply hole during operation of the engine. The body and the plunger can rotate independently relative to lash adjuster mounting bore about their common axis. Nevertheless, the first and second oil supply holes are always communicated with each other via the annular communication passage formed between the sidewalls of the body and plunger.

Since the check valve provided in the annular communication passage in association with the second oil supply hole can close/open the second oil supply hole in response to the pressure of the hydraulic oil led from the external oil supply line to the second oil supply hole, the check valve will close the second oil supply hole and stops the oil from flowing into the cylinder when the engine is stopped and the oil pressure acting on the check valve is lowered.

During operation on the other hand, since a high hydraulic oil pressure in the second oil supply hole acts on the check valve, the check valve opens the second oil supply hole to allow the pressurized oil to flow from the second oil supply hole into the cylinder. At the same time, the recycling of the leak-down oil takes place, that is, the hydraulic oil in the high pressure chamber closed by the check ball is returned therefrom to the reservoir via the gap between the body and the plunger and via the first oil supply hole.

When the engine is stopped, the second oil supply hole is closed by the check valve in the manner as described above, so that the oil level in the reservoir communicated with the high pressure chamber will not be lowered below the upper open end of the body. Thus, a much larger amount of hydraulic oil is maintained in the reservoir than in conventional reservoirs.

In the hydraulic lash adjuster for an internal combustion engine as defined in claim 2, the hydraulic lash adjuster for an internal combustion engine defined in claim 1, the annular communication passage is a circumferential groove formed in the inner surface of the sidewall of the body; the check valve is a belt-shaped leaf spring adapted to abut against the bottom face of the circumferential groove; and the check valve has an engagement protrusion capable of engaging the second oil supply hole for axial and circumferential positioning of the leaf spring in association with the second oil supply hole.

(Function)

During operation, the pressurized hydraulic oil led from an external oil supply line to the second oil supply hole pushes the protruding face of the engagement protrusion of the leaf spring away from the second oil supply hole, so that the region surrounding the protrusion (hereinafter simply referred to as surrounding region) is resiliently deformed radially inward direction. As a result, the surrounding region, though in intimate contact with the outer circumference of the annular communication passage (that is, in contact with the periphery of the second oil supply hole formed in the inner circumference of the body) while the engine is stopped, is moved away from the periphery. The pressurized oil then flows into the annular communication passage through the gap between the leaf spring and the second oil supply hole. When the engine is stopped, the hydraulic pressure acting on the surrounding region of the engagement protrusion of the leaf spring vanishes. Thus, under the elastic force of the leaf spring, the surrounding region restores the original engagement position to close the second oil supply hole.

The engagement protrusion of the leaf spring has a round or a tapered cylindrical configuration that can engage the second oil supply hole. As a result, the more the surrounding region of the engagement protrusion is displaced from the oil supply hole, the larger becomes the cross section of the flow of oil between the protrusion and the second oil supply hole. The resiliency of the leaf spring and the height of the engagement protrusion are properly selected so that the engagement protrusion is not completely displaced out of the second oil supply hole if the check valve is moved from the second oil supply hole. In other words, the engagement protrusion is so configured as to retain axial as well as circumferential position of the leaf spring in the second oil supply hole.

Besides the circumferential groove formed in the inner surface of the sidewall of the body, that is, the annular communication passage, serves to secure communication between the first and the second oil supply holes and lead the oil from the second oil supply hole to the first oil supply hole, the annular communication passage serves as a positioning means for limiting the axial position of the leaf spring in the oil passage.

In the hydraulic lash adjuster for an internal combustion engine as defined in claim 3, the sidewall of the lash adjuster for an internal combustion engine defined in claim 2 may have a further second oil supply hole, similar to the one described above, spaced apart at equal intervals along a circumference of the body, while the leaf spring may have the same multiplicity of engagement protrusions as the second oil supply holes adapted to fit in the respective second oil supply holes.
(Function)

In this case, the pressurized oil is smoothly induced from the multiplicity of the second oil supply holes into the annular communication passage.

The engagement protrusions of the leaf spring, adapted to engage the respective second oil supply holes distributed in the circumferential direction in the body at equal angular intervals, facilitate secure axial as well as circumferential positioning of the leaf spring relative to the second oil supply holes.

In the hydraulic lash adjuster for an internal combustion engine as defined in claim 2 or 3, the leaf spring may be provided with slits in the opposite sides of the engagement protrusion to regulate the resiliency (inverse of the spring constant) of the region of the leaf spring surrounding that engagement protrusion, as defined in claim 4.
(Function)

By providing the leaf spring with slits, the section modulus of that slit region is lowered than that of a non-slit region, and the resiliency (inverse of the spring constant) of the slit region is increased than that of the non-slit region.

Thus, if the leaf spring is provided in the entire region thereof with slits, the resiliency (or inverse of the spring constant) of the entire leaf spring is enhanced. Consequently, the resiliency of the surrounding regions of the multiple engagement protrusions is enhanced. Accordingly, the sensitivity of the check valve for opening/closing the second oil supply holes is enhanced.

If the leaf spring is provided with slits only in the surrounding region of a selected protrusion, only that surrounding region acquires increased resiliency and can be elastically deformed by the pressurized hydraulic oil led to the second oil supply hole associated with that protrusion. Thus, the protrusion serves as a check valve. On the other hand, the surrounding regions of protrusions having no slit have lower resiliency, and will not be appreciably deformed by the pressurized oil and retain the associated second oil supply holes closed. In other words, the surrounding regions of protrusions having no slit (regions of low resiliency) always stay in intimate contact with the peripheries of the associated second oil supply holes irrespective of whether the engine is in operation or not. Thus, these surrounding regions (of low resiliency) function as positioning means for positioning the leaf spring at a correct axial and circumferential position, rather than functioning as a check valve for opening/closing the second oil supply holes.

As defined in claim 5, in the hydraulic lash adjuster defined in claim 1, the annular communication passage may be a circumferential groove formed in the outer surface of the sidewall of the plunger; a check valve may be a ball that is movable in the circumferential groove and has a larger specific gravity than the hydraulic oil and an outer surface adapted to partially engage the second oil supply hole; and a longitudinal groove extending upward from the second oil supply hole may be formed in the inner surface of the sidewall of the body to allow the movement of the ball to achieve proper axial and circumferential positioning of the ball relative to the second oil supply hole.

(Function) The check valve can be simply a ball having a larger specific weight than the hydraulic oil.

During operation of the internal combustion engine, the ball is forced out of the second oil supply hole and moved upward in the longitudinal groove by the pressurized hydraulic oil introduced from an external oil passage to the second oil supply hole. Thus, the pressurized oil is allowed to enter the annular communication passage through the second oil supply hole. On the other hand, when the engine is stopped, the upward force of the hydraulic oil lifting the ball disappears. Hence the ball moves downward in the longitudinal groove, until it returns to its home position in the second oil supply hole to close the second oil supply hole. Thus, the upward longitudinal groove formed in the inner surface of the sidewall of the body serves as an axial and circumferential positioning means for placing the ball (serving as a check valve) correctly in the second oil supply hole.

Results of the Invention

In the inventive hydraulic lash adjuster as defined in claim 1, leak-down oil is recycled during the operation of the engine, while the level of the oil in the reservoir communicated with the high pressure chamber is maintained to the open end of the body of the lash adjuster when the engine is stopped. Hence, a large amount of oil is stored in the reservoir. Thus, the adjuster can overcome the prior art problem that air is drawn into the high pressure chamber when the engine is restarted.

As defined in claim 2, the leaf spring serving as a check valve is properly set in position at the correct axial as well as circumferential location in association with the second oil supply hole, which ensures long-lasting proper valve opening/closing operation of the check valve.

In the inventive hydraulic lash adjuster as defined in claim 3, multiple second oil supply holes enable smooth flow of the pressurized hydraulic oil into the annular communication passage.

Further, the leaf spring having multiple protrusions spaced apart at equal angular intervals along the circumference of the body can be positioned at a proper axial and circumferential location, which ensures long-tasting proper opening/closing operation of the check valve for the second oil supply holes.

In the inventive hydraulic lash adjuster as defined in claim 4, the resiliency and sensitivity of the check valve can be regulated by slits provided in the entire length of the leaf spring. Thus, the leaf spring has a wider optional range of materials.

In the case where slits are provided across only a limited number of engagement protrusions, only those engagement protrusions have enhanced resiliency to act as check valves. The remaining surrounding regions having less resiliency remain in close contact with the peripheries of the associated second oil supply holes, thereby serving as the positioning means for placing the leaf spring at an axially and circumferentially right position relative to the multiple second oil supply holes, which ensures long-lasting proper opening/closing operation of the check valve.

In the device as defined in claim 5, a check valve in the form of a ball can be placed at the correct axial and circumferential position relative to the second oil supply hole, ensuring long-lasting proper opening/closing operation of the check valve for the second oil supply hole.

BRIEF DESCRIPTION OF TILE DRAWINGS

Figure 15:
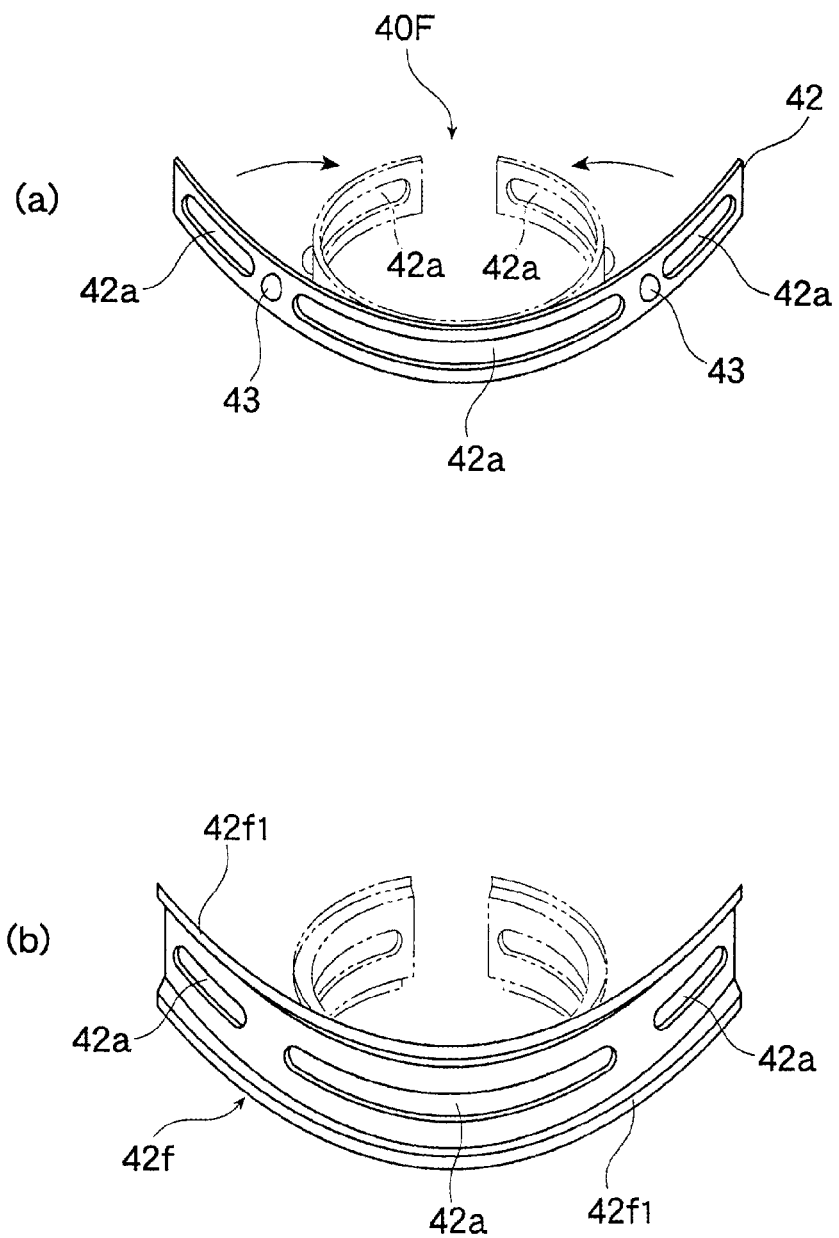

FIG. 15 is an enlarged perspective view of a check valve (leaf spring) constituting a primary section of a hydraulic lash adjuster for internal combustion engine in accordance with a sixth embodiment of the invention. More particularly, FIG. 15(a) is a perspective view of the check valve. FIG. 15(b) is a perspective view of a backup leaf spring for backing up the check valve.

Figure 16:
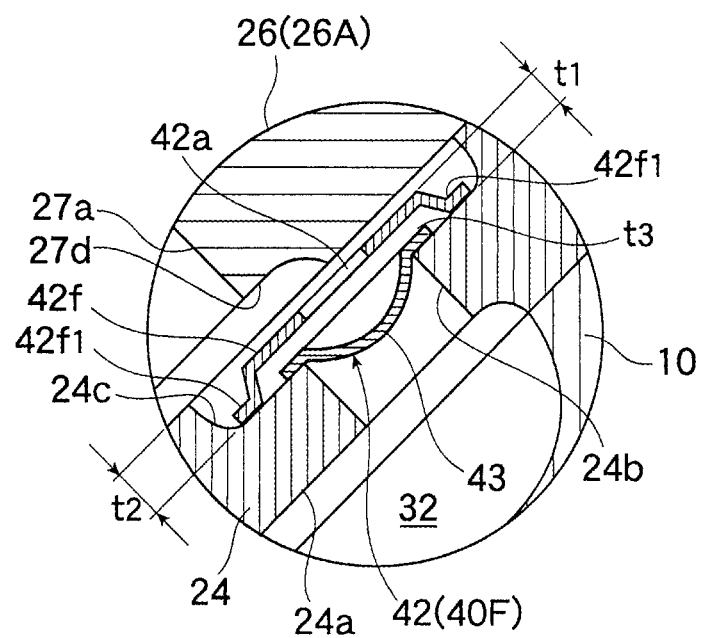

FIG. 16 shows a partial enlarged axial cross section of the body near one second oil supply hole when the body is equipped with the sixth check valve.

Figure 17:
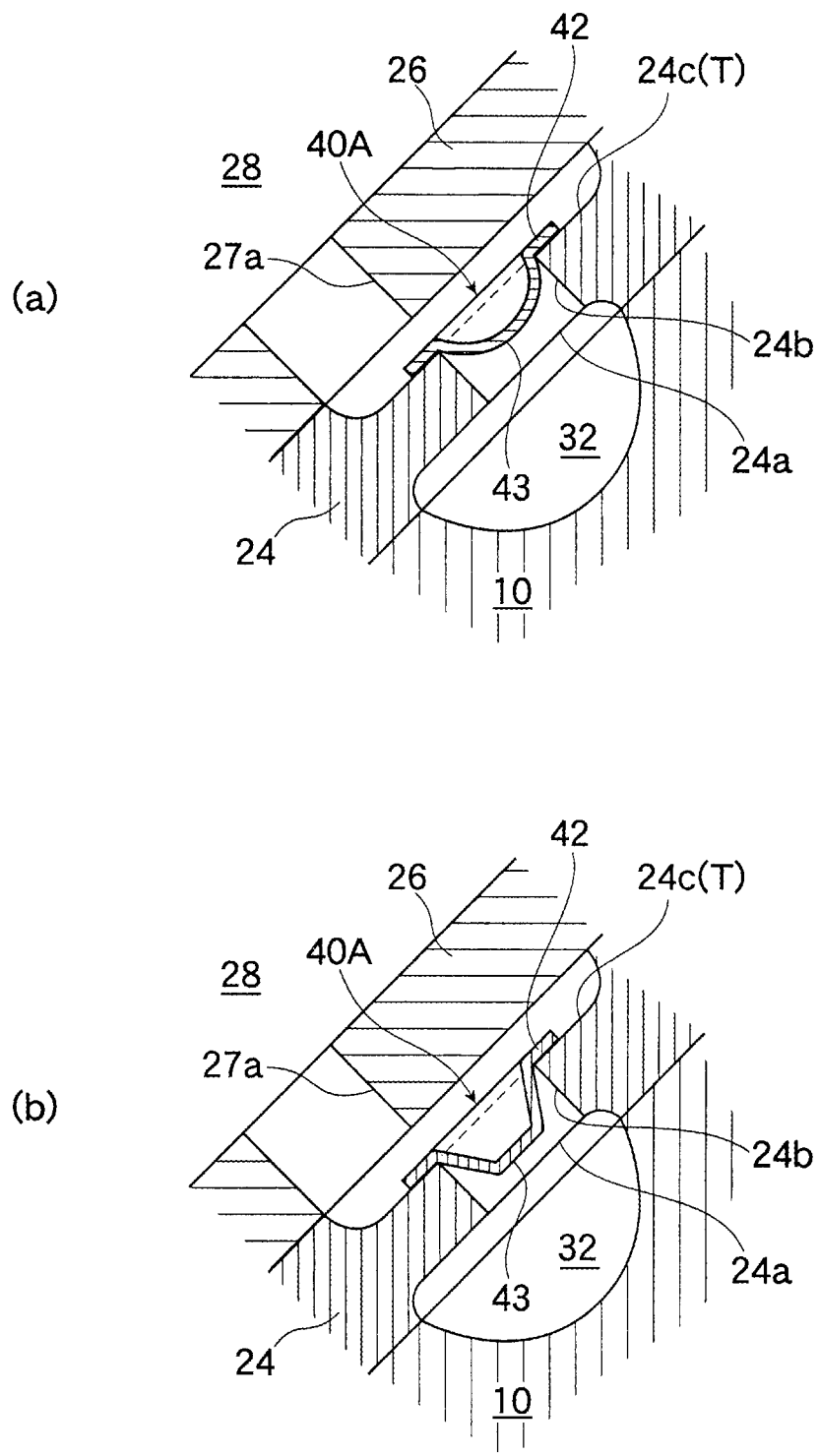

FIG. 17(a) is a partial enlarged axial cross sectional view of the body constituting a primary section of a hydraulic lash adjuster for an internal combustion engine in accordance with a seventh embodiment of the invention, showing the configuration of the hydraulic lash adjuster near one second oil supply hole. FIG. 17(b) shows a similar partial, cross section of the portion of the hydraulic lash adjuster having a modified form of the check valve shown in FIG. 17(a).

Figure 18:
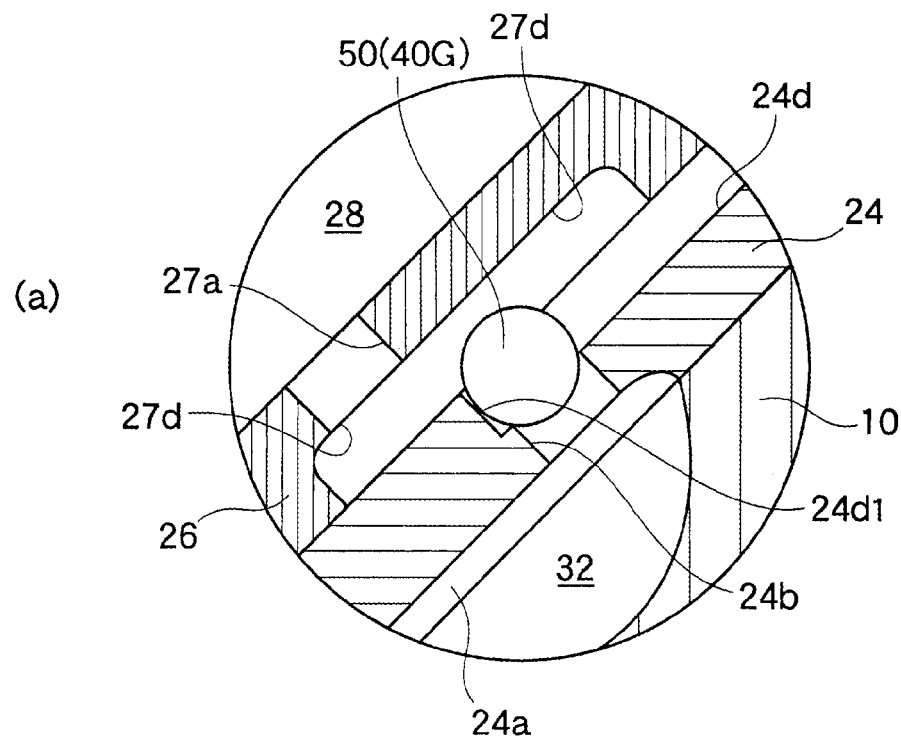
Figure 18:
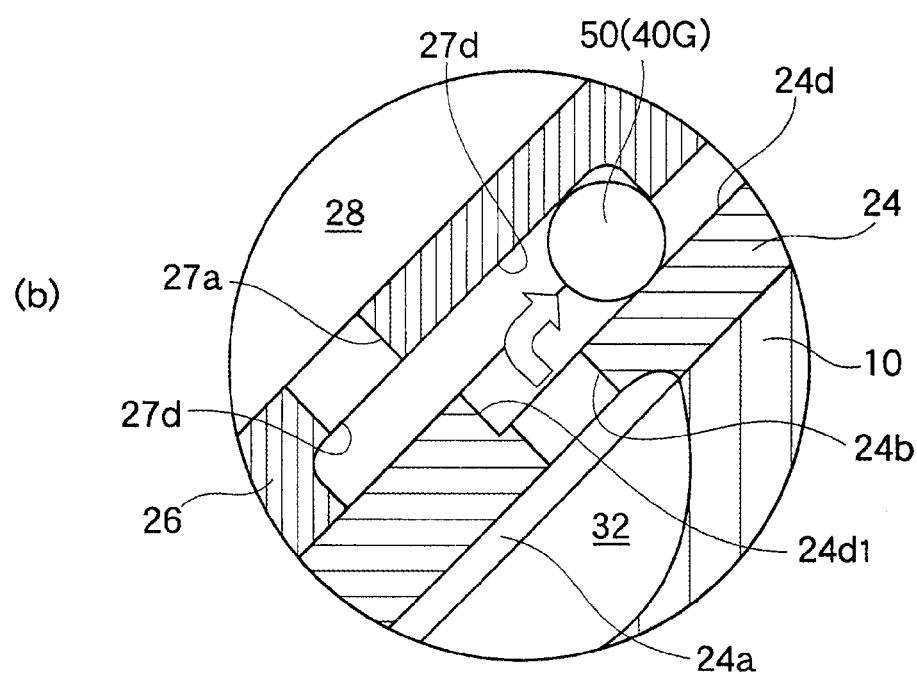

FIG. 18 is a partial enlarged axial cross sectional view of the body constituting a primary section of a hydraulic lash adjuster for an internal combustion engine in accordance with a seventh embodiment, of the invention. More particularly, FIG. 18(a) shows a check valve in the form of a steel ball in position at one second oil supply hole, and FIG. 18(b) shows the check valve (steel ball) displaced from the second oil supply hole to open the second oil supply hole.

Figure 19:
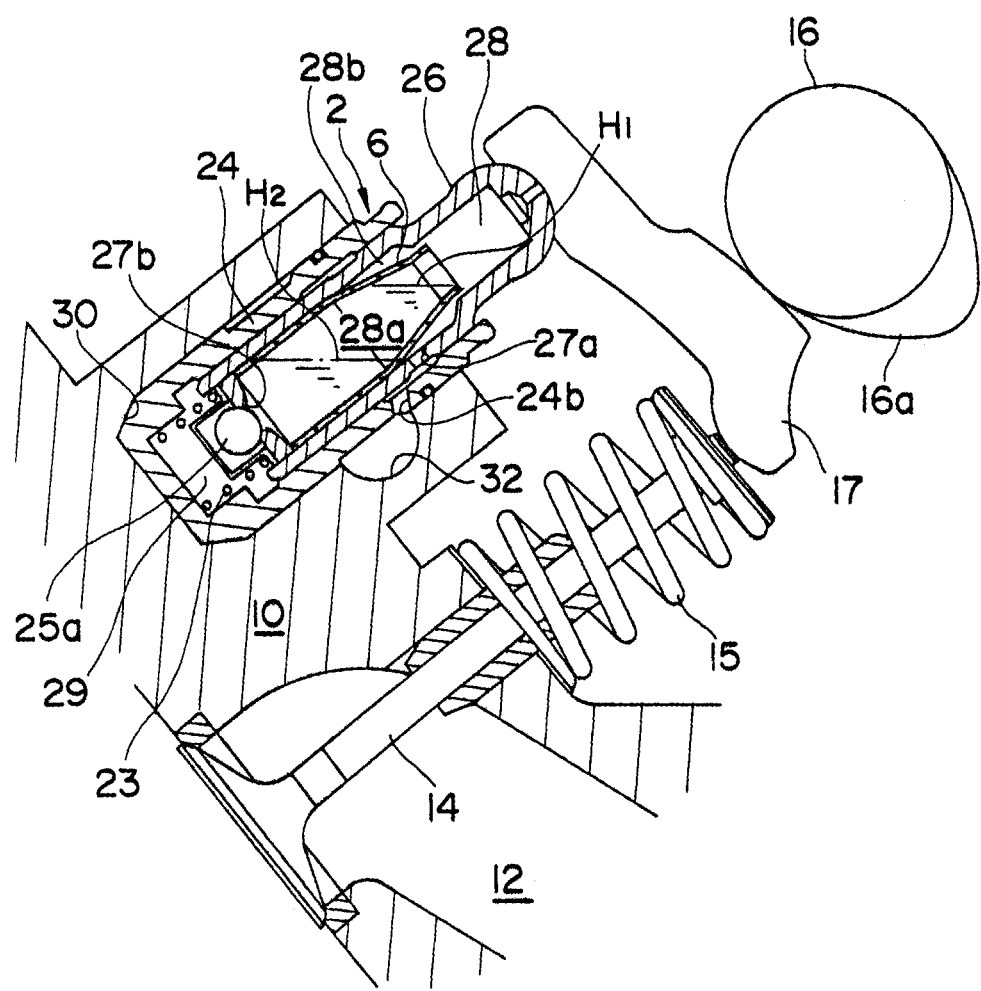

FIG. 19 shows a cross section of a valve actuation mechanism equipped with a conventional hydraulic lash adjuster for an OHC type internal combustion engine.

BEST MODE FOR CARRYING OUT THE INVENTION

The invention will now be described in detail by way of example with reference to the accompanying drawings.

Referring to FIGS. 1 through 4, there is shown a hydraulic lash adjuster for an internal combustion engine in accordance with a first embodiment of the invention.

In these Figures, the air supply passage 12 formed in the cylinder head 10 of the engine is connected to an opening of a combustion chamber A. The opening is closed/opened by a valve member (air intake valve) 14. The valve member 14 is urged by a spring 15 to close the opening of the air supply passage 12. The top end of the valve member 14 abuts against a rocker arm 17 rocked by the rotation of the cam 16. The cam 16 has a cam nose 16a.

Provided adjacent the valve member 14 is a hydraulic lash adjuster 20, which comprises a lash adjuster body 22 inserted in an adjuster mounting bore 30 formed in the cylinder head 10. The adjuster mounting bore 30 has an upper open end and a closed lower end (bottom). The lash adjuster body 22 primarily consists of a cylindrical body 24 having an upper open end and a lower bottom end, and a plunger 26 inserted in the cylindrical body 24 such that the plunger 26 can slide up and down in the body 24.

Formed in the sidewall of the body 24 is a second oil supply hole 24b communicated with an oil gallery (oil supply passage) 32 formed in the cylinder head 10. A circumferential shallow groove 24a is formed in the region of the outer surface of the sidewall of the body 24 that includes the second oil supply hole 24b. The second oil supply hole 24b and oil gallery 32 are communicated with each other through the circumferential groove 24.a if the body 24 is rotated about its axis relative to the adjuster mounting bore 30.

On the other hand, the plunger 26 has one end in contact with one end of the rocker arm 17 remote from another end thereof in contact with the valve member. The end of the plunger supports from below the rocker arm 17, and serve as the fulcrum of the rocker arm 17. The plunger 26 consists of an upper hollow cylindrical portion 26A having an axial through-hole 27c formed in the top end thereof and a lower portion 26B having a generally H-shaped axial cross section and a small axial through-hole. The upper and lower portions are coaxially aligned and soldiered together.

Figure 4:
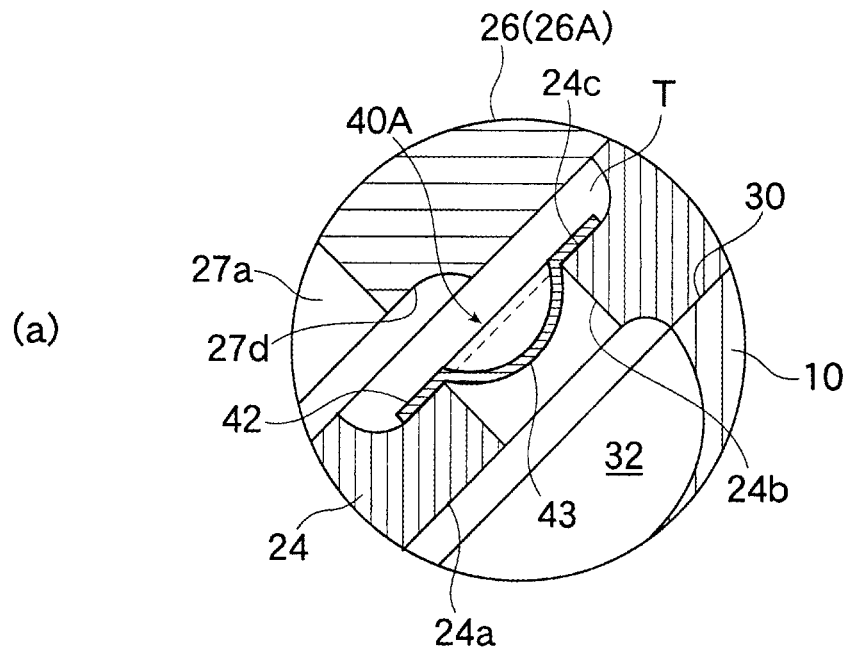
FIG. 4 shows a partial cross section (FIG. 4(a)) of the check valve (leaf spring) in operation, closing the second oil supply hole, along with a partial cross section (FIG. 4(b)) of the check valve positioned to open the second oil supply hole.
Figure 4:
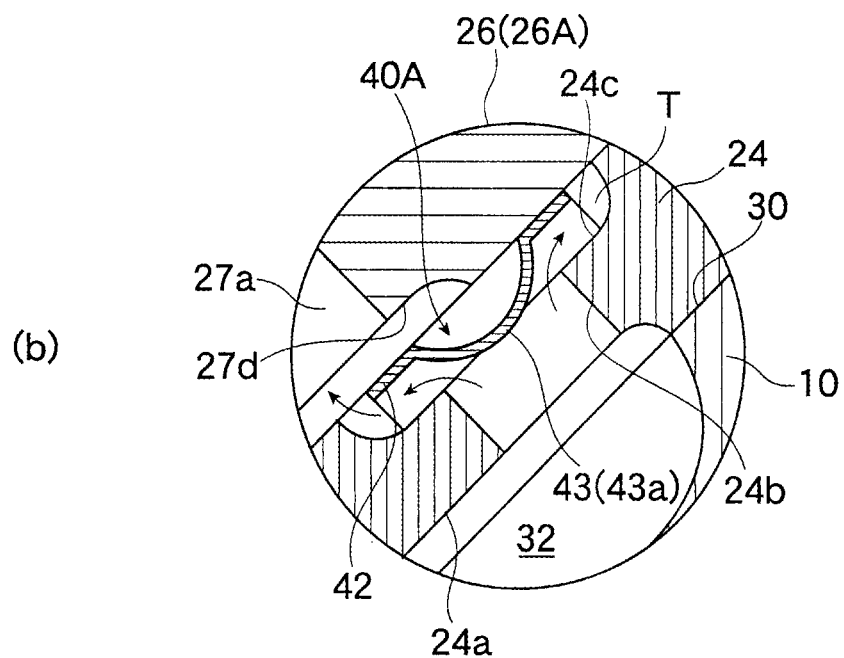

Formed in the sidewall the an upper portion 26A is a first oil supply hole 27a, which is communicated with the second oil supply hole 24b formed in the sidewall of the body 24 through an annular communication passage T formed between the upper portion 26A of the plunger and the sidewall of the body 24. A reservoir 28 formed inside the plunger 26 is communicated with the oil gallery 32 via the first oil supply hole 27a, annular communication passage T, and the second oil supply hole 24b of the body 24. As shown in FIG. 4, a circumferential shallow groove 24c is formed in the inner surface of the sidewall of the body 24 in association with the second oil supply hole 24b. Reference numeral 27d (FIG. 4) indicates a circumferential shallow groove formed in the outer surface of the sidewall of the upper portion 26A of the plunger 26 in association with the second oil supply hole 27a. The circumferential shallow grooves 24c and 27d are formed to overlap each other such that they always establish the annular communication passage T if the plunger 26 is displaced upward and downward in the axial direction, thereby always communicating the first oil supply hole 27a of the plunger 26 with the second oil supply hole 24b of the body 24.

Thus, while the plunger 26 and body 24 can slide not only in the circumferential direction but also in the axial direction relative to each other, they can maintain communication between the first oil supply hole 27a of the plunger 26 and the second oil supply hole 24b of the body 24 through the annular communication passage T.

The reservoir 28 inside the plunger 26 is communicated on one hand with a high pressure chamber 29 formed between the plunger 26 and the bottom of the body 24 via the small hole 27b, and is opened on the other hand to the formed in the top end of the plunger 26 at an lower portion of the reservoir 28, and is open to the surrounding atmosphere via the small hole 27c formed in the top end of the plunger 26. The small hole 27c allows the hydraulic oil from the reservoir 28 to the valve mechanism. Reference numeral 23 indicates a plunger spring; 25a check ball for closing the small hole 27b by the spring force of a spring 25b; and 25c ball cage. When the hydraulic oil is pressurized, the check ball 25a serving as a check valve closes the small hole 27b, thereby rendering the plunger 26 locked in position and serves as a fulcrum of the rocker arm 17. A retaining ring 24d is provided at the open end of the body 24 to prevent the plunger 26 from coming off the body 24.

A check valve 40A is mounted in the circumferential shallow groove 24c formed in the outer surface of the sidewall of the body 24 to keep the second oil supply hole 24b closed so as to stop the flow of supplying oil therefrom to the reservoir 28 while the engine is stopped. When the engine is in operation, the second oil supply hole 24b is opened to supply the reservoir 28 with hydraulic oil.

The check valve 40A (leaf spring 42) is mounted in abutment against the bottom of the circumferential groove 24c of the body 24 (that is, against the outer periphery of the communication passage T) such that the check valve can be displaced therefrom when pressurized hydraulic oil is led from the oil gallery 32 to the second oil supply hole 24b and pushes the check valve, thereby opening the second oil supply holes 24b.

Figure 1:
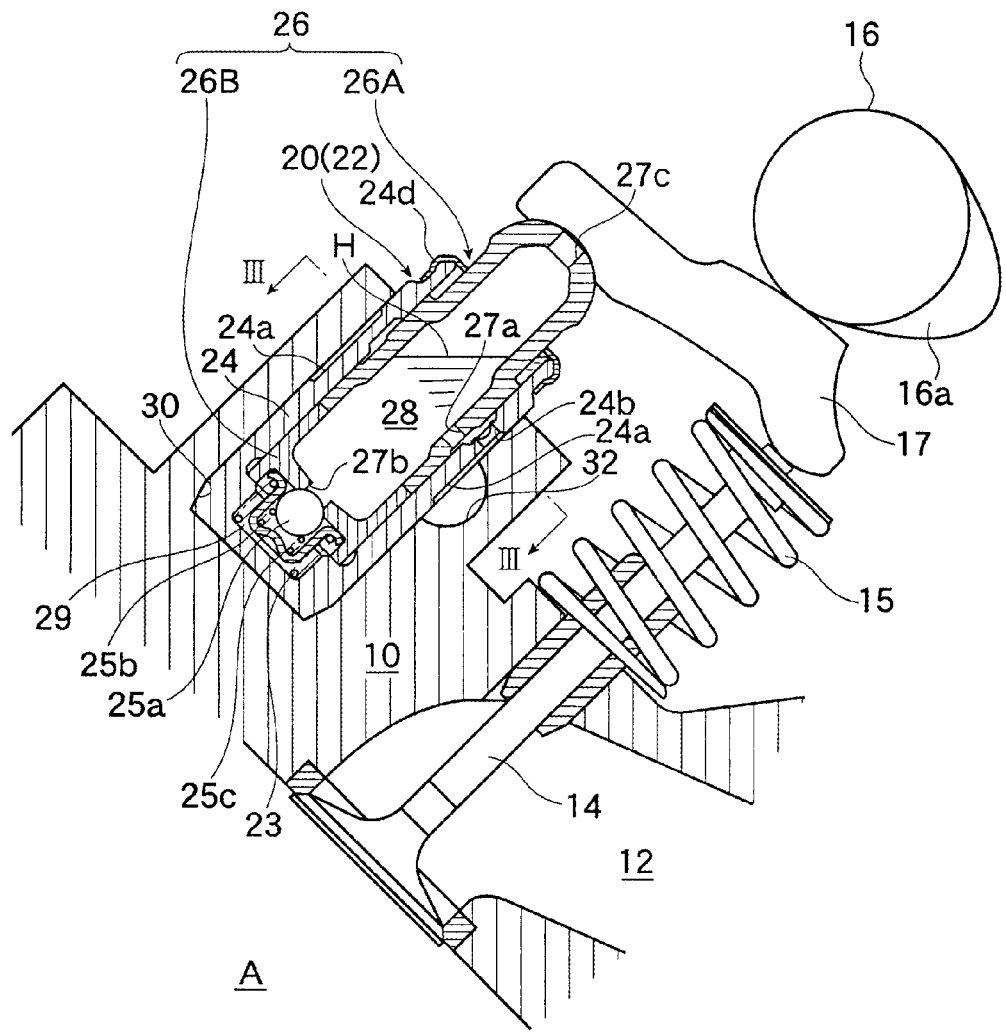
FIG. 1 shows a cross section of a valve actuation mechanism for an OHC type internal combustion engine equipped with a hydraulic lash adjuster in accordance with a first embodiment of the invention.
Figure 2:
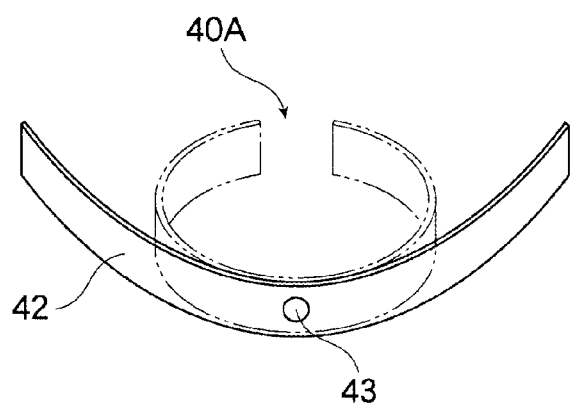
FIG. 2 is an enlarged perspective view of a check valve (leaf spring) constituting a primary portion of the hydraulic lash adjuster shown in FIG. 1.
Figure 3:
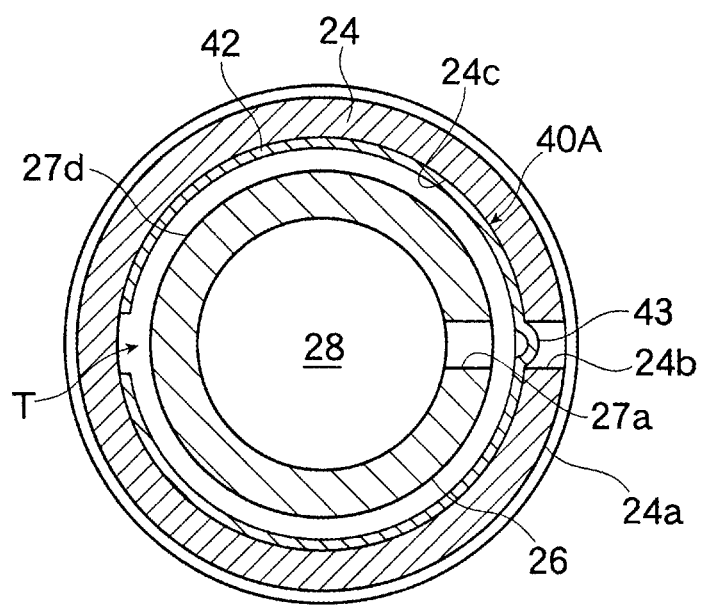
FIG. 3 shows a transverse cross section of the hydraulic lash adjuster taken along line of FIG. 1, the check valve (leaf spring) positioned in alignment with a second oil supply hole.

The check valve 40A is made of an arcuate metal or plastic leaf spring 42 and has a smaller radius of curvature (or a larger radius) than the bottom face of the circumferential groove 24c of the body 24 (and the outer periphery of the annular communication passage T), as shown in FIGS. 2 and 3. The leaf spring 42 is provided at substantially the longitudinal center thereof with an engagement protrusion 43 projecting outwardly for engagement with the second oil supply hole 24b.

The engagement protrusion 43 can be formed by pressing the leaf spring 42 into around shape with its base section configured to close the second oil supply hole 24b when fitted in the inner circumference of the second oil supply hole 24b. The region surrounding the engagement protrusion 43 (the region hereinafter referred to as surrounding region) is so configured that the more the engagement protrusion 43 is displaced away from the periphery of the second oil supply hole 24b, the more the opening (i.e. cross sectional area of the flow of oil through the oil supply holes 24b) increases.

The resiliency (inverse of the spring constant) of the leaf spring 42 and the dimensions of the engagement protrusion 43 are appropriately chosen so that the top end 43a of the engagement protrusion 43 will not fully displaced out of the second oil supply hole 24b, as shown in FIG. 4(b), when the check valve 40A opens the second oil supply hole 24b (that is, when the surrounding region of the engagement protrusion 43 is displaced from the periphery of the second oil supply hole 24b). Thus, the engagement protrusion 43 is adapted to function as an axial and circumferential positioning means for placing the leaf spring 42 (check valve 40A) in position in association with the second oil supply hole 24b.

Specifically, the protruding height of the engagement protrusion 43 of the leaf spring 42 is designed such that the engagement protrusion 43 is not completely removed out of the second oil supply hole 24b if its surrounding region is displaced away from the periphery of the second oil supply hole 24b by the pressure of the hydraulic oil.

Further, the resiliency of the leaf spring 42 is properly set by, for example, selecting an appropriate spring material and by regulating the section modulus of the leaf spring so that the surrounding region, if displaced from the circumference of the second oil supply hole 24b by the pressurized oil, will not come into the circumferential groove 27d of the plunger 26 and block the sliding motion of the plunger 26 relative to the body 24.

To mount the check valve 40A (leaf spring 42) in the circumferential groove 24c of the body 24, the leaf spring 42 is once compressed as shown in FIG. 2 by a phantom profile before it is fitted in the circumferential groove 24c with the engagement protrusion 43 aligned with the second oil supply hole 24b. The check valve 40A will firmly abut against the bottom of the circumferential groove 24c by the resilient force of itself, as shown in FIG. 4(a).

The surrounding region of the engagement protrusion 43 of the leaf spring 42 (or check valve 40A) is in engagement with the second oil supply hole 24b as shown in FIG. 4(a) while the engine is stopped. However, this region is pushed in the radially inward direction by the hydraulic oil led from the oil gallery 32 to the second oil supply hole 24b as shown in FIG. 4(b) when the engine is in operation. As a consequence, the region is then displaced away from the periphery of the second oil supply hole 24b. This deformation of the surrounding region allows the pressurized hydraulic oil to flow into the annular communication passage T through the gap created between the surrounding region and the second oil supply hole 24b as shown in FIG. 4(b) by arrows, and further to the reservoir 28 via the first oil supply hole 27a. When the engine is stopped, the pressure of the hydraulic oil acting on the surrounding region of the engagement protrusions 43 disappears, which causes the surrounding region returns to its engagement position in the second oil supply hole 24b and closes the second oil supply hole 24b (as shown in FIG. 4(a)), thereby stopping the hydraulic oil from flowing into the reservoir 28.

Thus, in this embodiment, the engagement protrusion 43 of the leaf spring 42 has an axial and circumferential positioning function to align the check valve 40A with the second oil supply hole 24b. Accordingly, the leaf spring securely provides long term closing/opening function of the check valve 40A to the second oil supply hole 24b.

Moreover, during operation, the leak down oil is recycled from the high pressure chamber to the reservoir 28 through a gap between the body 24 and the plunger 26 and through the first oil supply hole 27a. On the other hand, when the engine is stopped, the second oil supply hole 24b is kept closed by the check valve 40A to maintain the oil level in the reservoir as high as the oil level H shown in FIG. 1, thereby filling the reservoir 28 communicated with the high pressure chamber 29 with a great amount of hydraulic oil. Thus, when the engine is restarted, no air will be induced in the high pressure chamber 29.

Figure 5:
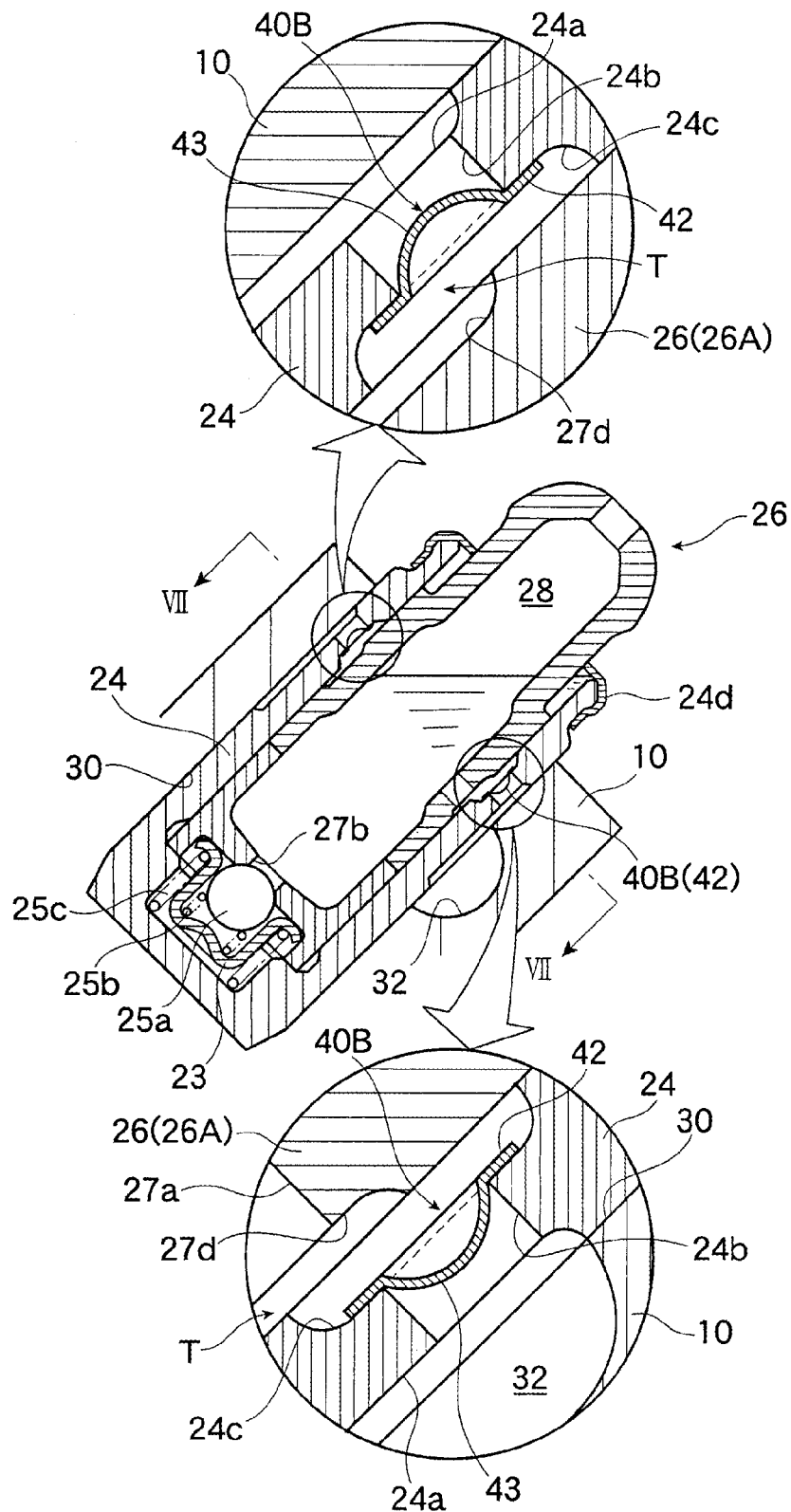
FIG. 5 shows in cross section a valve actuation mechanism for an OHC type internal combustion engine equipped with a hydraulic lash adjuster in accordance with a second embodiment of the invention.
Figure 6:
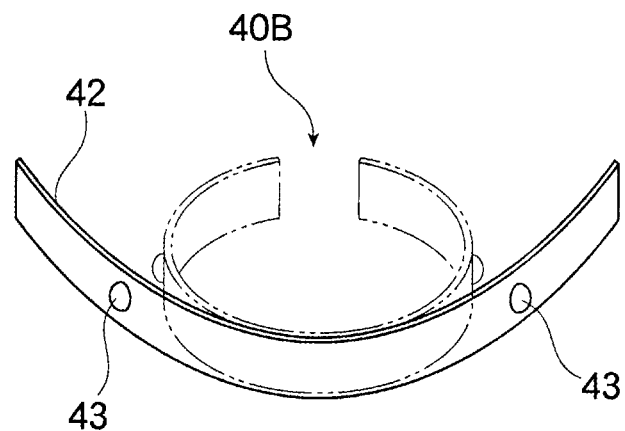
FIG. 6 is an enlarged perspective view of the check valve (leaf spring) constituting a primary portion of the hydraulic lash adjuster.
Figure 7:
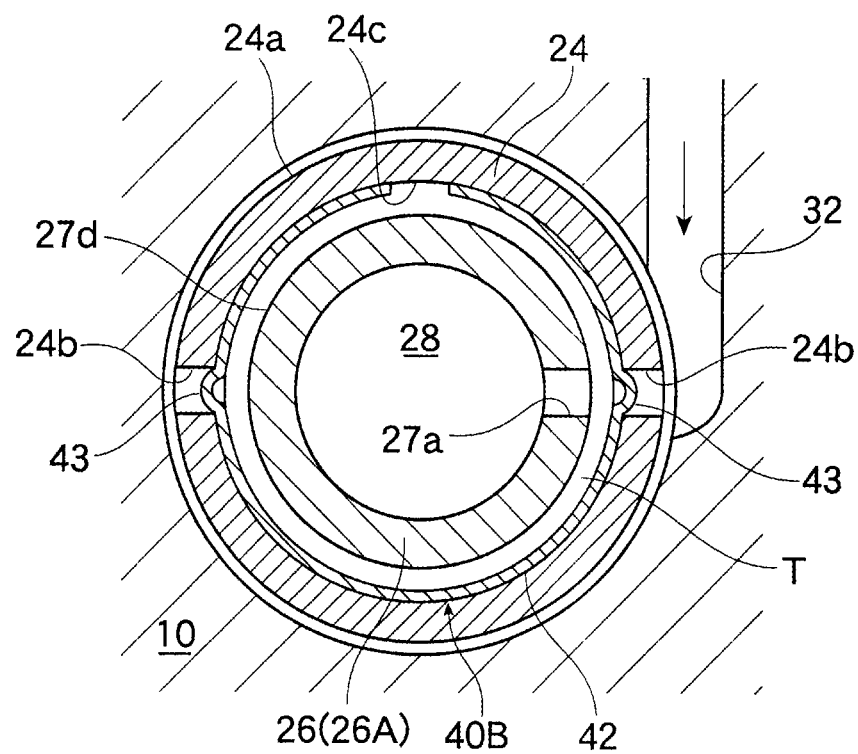
FIG. 7 shows a transverse cross section of a hydraulic lash adjuster having a check valve positioned in alignment with the second oil supply holes, the cross section taken along line VII-VII of FIG. 5.

Referring to FIG. 5 through 7, there is shown a hydraulic lash adjuster in accordance with a second embodiment of the invention.

In the second embodiment, the body 24 is provided with two second oil supply holes 24b spaced apart at equal angular intervals along an inner circumference of the sidewall of the body 24, while a leaf spring 42 constituting a check valve 40B is provided at two longitudinal positions thereof with two engagement protrusions 43 such that they can fit in the respective second oil supply holes 24b when the leaf spring is fit in the circumferential groove formed in the sidewall of the body 24.

During operation of the engine, the hydraulic oil stored in the oil gallery 32 is led to the pair of the oil supply holes 24b via the circumferential groove 24a formed in the outer circumferential sidewall of the body 24. The pressurized oil exerts an radially inward pressure on the surrounding regions of the paired engagement protrusions 43 of the check valve 40B in engagement with the second oil supply holes 24b, thereby deforming the surrounding regions radially inwardly and opening the two second oil supply holes 24b substantially simultaneously. As a consequence, the pressurized oil is induced from the respective second oil supply holes 24b into the annular communication passage T, resulting in smooth supply of the hydraulic oil to the reservoir 28.

Since the two engagement protrusions 43 of the leaf spring 42 are configured to fit in the two second oil supply holes 24b of the body 24, they have axial and circumferential positioning functions. This check valve 40B is superior to the first check valve 40A regarding the axial and circumferential positioning function of a check valve with respect to the second oil supply holes 24b.

Other features of the second embodiment are the same as those of the first embodiment, and further details of the second embodiment will be omitted by simply referring to like elements by the same reference numerals in the two embodiments.

Figure 8:
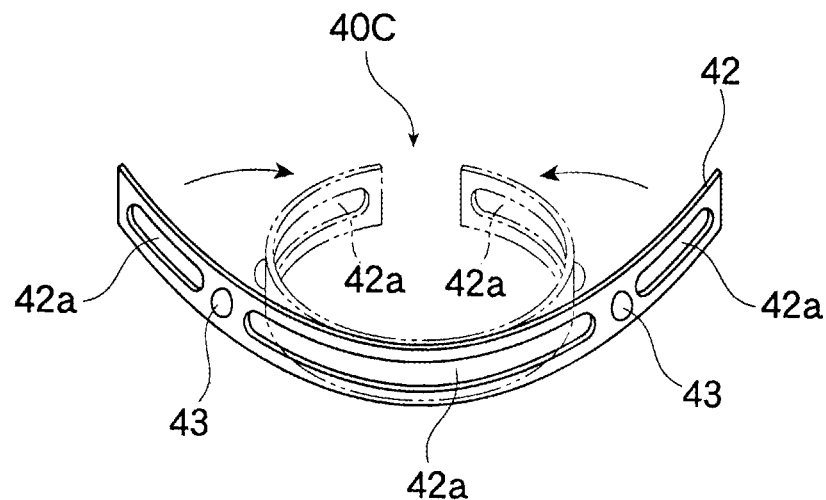
FIG. 8 is an enlarged perspective view of a check valve (leaf spring) constituting a primary section of a hydraulic lash adjuster for an internal combustion engine in accordance with a third embodiment of the invention.
Figure 9:
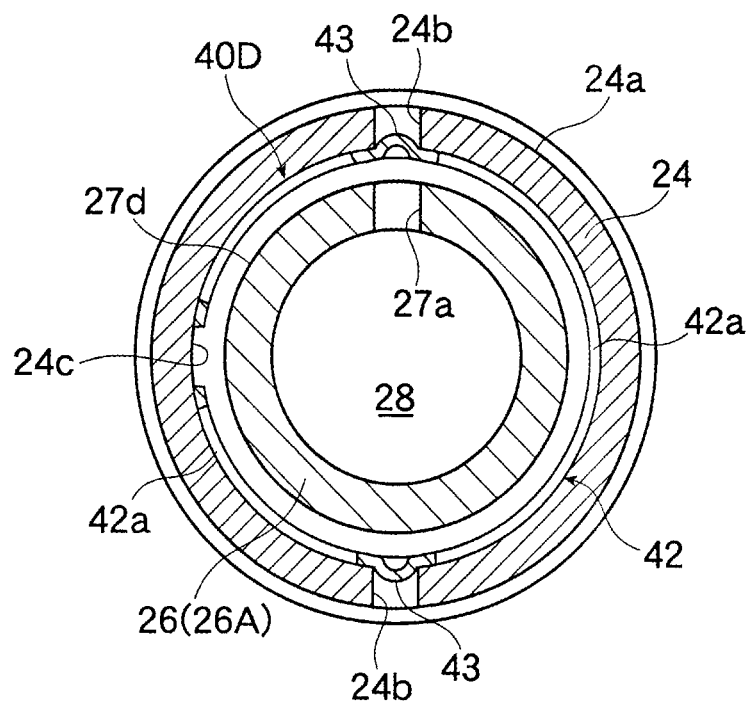
FIG. 9 shows a transverse cross section of a hydraulic lash adjuster having a check valve (leaf spring) positioned in alignment with the second oil supply holes (similar to FIG. 3).

Referring to FIGS. 8 and 9, there is shown a hydraulic lash adjuster for an internal combustion engine in accordance with a third embodiment of the invention.

In the third embodiment, a leaf spring 42 constituting a check valve 40C is provided with elongate slits 42a in the regions other than the opposite ends thereof and the surrounding regions of the engagement protrusions 43. The check valve 40C is designed to allow quick flow of pressurized hydraulic oil through the second oil supply holes 24b and the annular communication passage T when the check valve 40C is opened.

When the engine is in operation, the surrounding regions of the engagement protrusions 43 of the leaf spring 42 is displaced away from the respective peripheries of the second oil supply holes 24b by the pressurized oil led to the second oil supply holes 24b (in a manner as shown in FIG. 4(b)), so that the pressurized oil flowing into the circumferential groove 24c enters the annular communication passage T not only through the gap round the opposite sides of the leaf spring 42 but also through the slits 42a of the leaf spring 42.

It is known in general that the section modulus of a leaf spring is reduced by a slit and that the resiliency (inverse of the spring constant) of the slit portion is increased. In this instance, the resiliency of the check valve 40C as a whole and the resiliency of the surrounding regions of the engagement protrusions are increased by the slits that extend in substantially the entire length of the leaf spring. Thus, this check valve has a better sensibility to the hydraulic pressure than the second check valve 40B shown in FIG. 6. In other words, the surrounding regions of the engagement protrusions 43 of the check valve 40C are deformable to a larger extent under a lower hydraulic oil pressure than the check valve 40B, thereby facilitating quick supply of hydraulic oil to the reservoir 28.

Other features of the third embodiment are the same as those of the first and second embodiments, and further details of the third embodiment will be omitted by simply referring to like elements by the same reference numerals as in the first and second embodiments.

Figure 10:
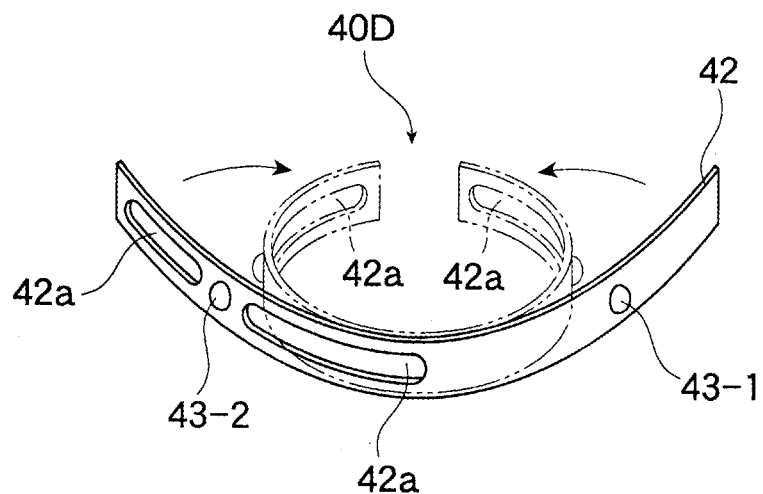
FIG. 10 is an enlarged perspective view of a check valve (leaf spring) constituting a primary section of a hydraulic lash adjuster for an internal combustion engine in accordance with a fourth embodiment of the invention.
Figure 11:
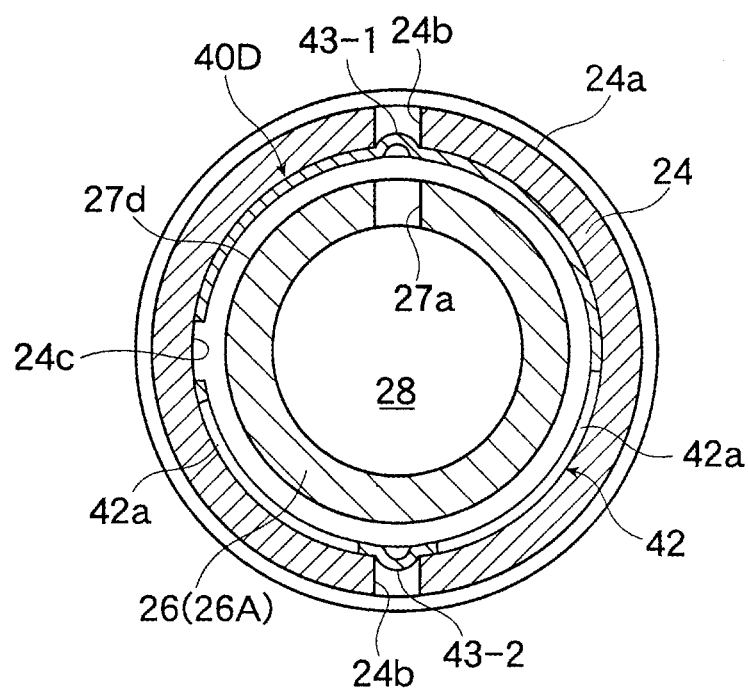
FIG. 11 shows a transverse cross section of a hydraulic lash adjuster with its check valve positioned in alignment with the second oil supply holes (similar to FIG. 3).

Referring to FIGS. 10 and 11, there is shown a fourth hydraulic lash adjuster for an internal combustion engine in accordance with a fourth embodiment of the invention.

It is recalled that in the third embodiment the check valve 40C has slits 42a in substantially the entire length of the leaf spring 42 to enhance the resiliency (inverse of the spring constant) of the leaf spring 42 as a whole and the resiliency of the surrounding regions of the engagement protrusions. In contrast, the check valve 40D of the fourth embodiment has slits 42a adjacent one engagement protrusion 43-1 lying in substantially one half of the leaf spring 42, so that only the surrounding region of the protrusion 43-1 has enhanced resiliency (spring constant).

As a consequence, only the surrounding region of the engagement protrusion 43-1 can be deformed by the pressurized hydraulic oil led to the second oil supply hole 24b and serves as a check valve for the second oil supply hole 24b. On the other hand, the surrounding region of the engagement protrusion 43-2 in the non-slit region has low resiliency that this region will not be deformed by the pressurized oil and maintains the associated oil supply hole 24b closed. In other words, irrespective of whether the engine is in operation or not, the surrounding region of the engagement protrusion 43-2 in the non-slit region always stays in the peripheral region of the associated oil supply hole 24b. Thus, the engagement protrusion 43-2 serves as a positioning means for seating the leaf spring 42 at a proper axial and circumferential position associated with a second oil supply hole 24b.

Thus, from the point of positioning function of the leaf spring, the check valve 40D is superior to the check valve 40C of the third embodiment.

Other features of the fourth embodiment are the same as those of the third embodiment, and further details of the fourth embodiment will be omitted by simply referring, to like elements by the same reference numerals as in the third embodiment.

Figure 12:
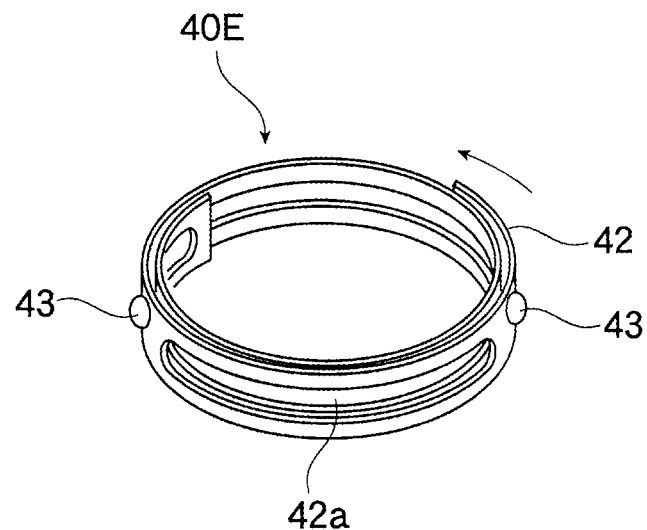
FIG. 12 is an enlarged perspective view of a check valve (leaf spring) constituting a primary section of a hydraulic lash adjuster for internal combustion engine in accordance with a fifth embodiment of the invention.
Figure 13:
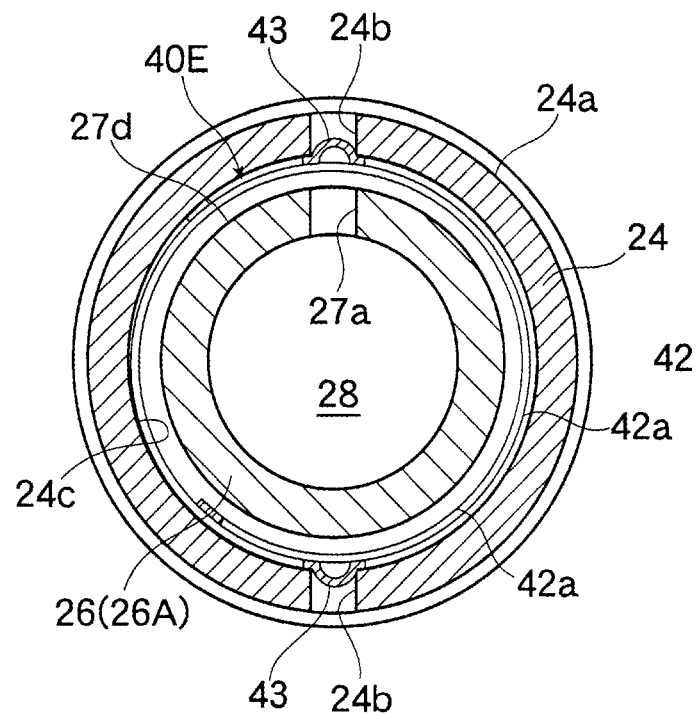
FIG. 13 shows a horizontal cross section of the hydraulic lash adjuster equipped with the check valve (leaf spring) positioned in alignment with the second oil supply holes (similar to FIG. 3).
Figure 14:
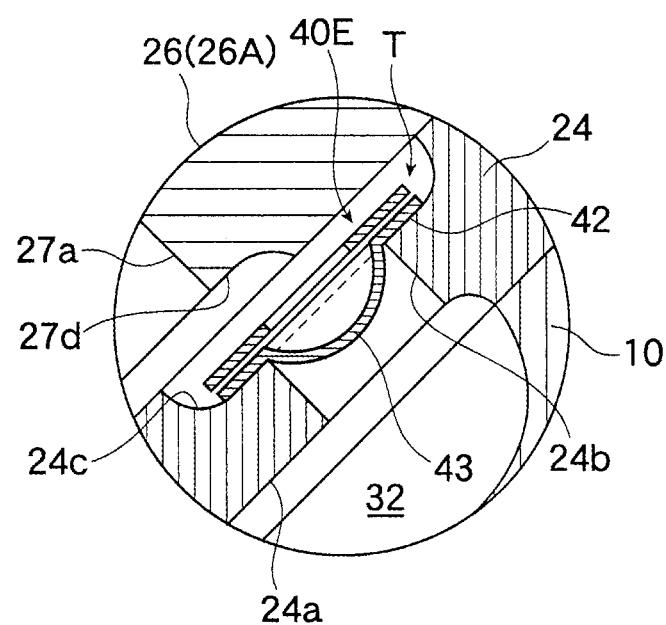
FIG. 14 shows a partial enlarged axial cross section of the body near one second oil supply hole when the body is equipped with the check valve.

Referring to FIGS. 12 through 14, there is shown a fifth hydraulic lash adjuster for internal combustion engine in accordance with a fifth embodiment of the invention.

Like the check valves 40B, 40C, and 40D of the second through fourth embodiments, respectively, the fifth check valve 40E is formed of a leaf spring 42 having two engagement protrusions 43 in association with two second oil supply holes 24b. To enhance the resiliency of the leaf spring in the surrounding regions of the engagement protrusions, the leaf spring 42 is also provided with longitudinal slits 42a in the regions thereof except for the opposite ends and the regions surrounding the engagement protrusions 43, as in the third check valve.

As shown in FIG. 14, the check valve 40E is formed of a leaf spring 42, which is partly double-coiled when it is fitted in the circumferential groove 24c.

Because of this configuration, when the check valve 40E is subjected to a high pressure of hydraulic oil, the surrounding regions of the engagement protrusions 43 are deformed radially inwardly only within the depth of the circumferential groove 24c due to the fact that the deformation of the surrounding regions is suppressed by the inner portion of the coiled leaf spring 42. As a consequence, during the operation of the engine, the surrounding regions of the engagement protrusions 43 will not interfere with the plunger 26 in the circumferential groove 27d.

The rest of the components of the fifth embodiment are structurally the same as those of the first one, and further details of this embodiment will be omitted with reference to the same reference numerals in the two embodiments.

Referring to FIGS. 15 and 16, there is shown a hydraulic lash adjuster for internal combustion engine in accordance with a sixth embodiment of the invention.

As shown in FIG. 15(a), the check valve 40F of the sixth embodiment has basically the same structure as the check valve 40C of the third embodiment (FIG. 8(a)), except that the check valve 40F has a backup member 42f (FIG. 15(b)) that extends over the entire length of the check valve so as to suppress the elastic deformation of the check valve 40F in the radially inward direction.

The backup member 42f is a leaf spring having a larger width than the check valve 40F, and is provided on the opposite sides thereof with leg portions 42f1 that abuts against the bottom of the circumferential groove 24c to enhance the rigidity of the backup member 42f.

When the backup member 42f is fitted in the circumferential groove 24c together with check valve 40F, the height t1 of the backup member 42f as measured from the bottom of the circumferential groove 24c is less than the depth t2 of the circumferential groove 24c. Provided between the leaf spring 42 serving as the check valve 40F and the backup member 42f covering the check valve 40F (leaf spring 42) is a gap t3 sufficient for the surrounding regions of the engagement protrusions 43 to be resiliently deformed away from the second oil supply hole 24b by the oil pressure to fully open the second oil supply hole 24b.

Other features of the sixth embodiment are the same as those of the first embodiment, and further details of the sixth embodiment will be omitted by simply referring to like elements by the same reference numerals as in the first embodiment.

Referring to FIG. 17(a), there is shown a primary portion of the hydraulic lash adjuster for an internal combustion engine in accordance with the seventh embodiment of the invention.

It is recalled that in the first through sixth embodiments, an annular communication passage T is constituted of the circumferential groove 24c formed in the inner surface of the sidewall of the body 24 and the circumferential groove 27d formed in the outer circumferential sidewall of the plunger 26 in order to communicate the first oil supply hole 27a formed in the plunger with the second oil supply hole(s) 24b formed in the body 24. In contrast, in the plunger of the seventh embodiment, no outer circumferential groove like circumferential groove 27d is provided. Instead, the annular, communication passage T for communicating the first oil supply hole 27a of the plunger 26 with the oil supply hole(s) 24b of the body 24 is solely constituted of the circumferential groove 24c formed in the inner surface of the sidewall of the body 24.

Fitted in the circumferential groove 24c formed in the sidewall of the body 24 is a check valve 40A (leaf spring 42) having an engagement protrusion 43 employed in the first embodiment.

Other features of the seventh embodiment are the same as those of the first embodiment, and further details of the second embodiment will be omitted by simply referring to like elements by the same reference numerals as in the first embodiment.

Since there is no groove like circumferential groove 27d in the sidewall of the plunger 26, this embodiment can avoid the interference issue discussed in connection with the first through sixth embodiments in which the leaf spring 42 can interfere with the circumferential groove 27d in the sidewall of the plunger 26 if the surrounding region(s) of the engagement protrusion(s) 43 is(are) excessively deformed by the pressurized hydraulic oil.

Each of the round engagement protrusions 43 formed on the leaf spring 42 of the first through seventh embodiments may be replaced by a protrusion in the form of a circular truncated cone with its outer diameter at the base section thereof equal to that of the corresponding oil supply holes 24b, as shown in FIG. 17(b).

When the engagement protrusion 43 is a circular truncated cone, the area of the opening of the second oil supply hole 24b increases with the distance between the surrounding region of the moved protrusion 43 and the circumferential region of the second oil supply hole 24b, faster than the round protrusion. Thus, the circular Truncated cone allows a smoother flow of hydraulic oil from the second oil supply hole 24b into the annular communication passage T.

Referring to FIG. 18, there is shown a primary section of the hydraulic lash adjuster for an internal combustion engine in accordance with the eighth embodiment of the invention.

The check valve 40G of the eighth embodiment is different in structure from the check valve of the first embodiment in that the check valve 40G has axial and circumferential positioning function relative to the body 24 as described in detail below, but other features of this embodiment are the same as those of the first embodiment.

In the eighth embodiment the annular communication passage T is constituted only of the circumferential groove 24c formed in the inner surface of the sidewall of the body 24, as contrasted in the embodiments 1 through 6 in which the annular communication passage T is constituted of the circumferential groove 24c and the circumferential groove 27d formed in the outer circumferential sidewall of the plunger 26. The annular communication passage T of the eighth embodiment is also different from that of the seventh embodiment, which is constituted only of the circumferential groove 24c formed in the sidewall of the body 24.

The check valve 40b of the eighth embodiment is a heavy steel ball 50 with its outer surface configured to partially fit in the second oil supply hole 24b formed in the sidewall of the body 24, in contrast to the preceding check valves 40A-40F made of a metal or plastic leaf spring.

The body 24 is provided in the inner surface of the sidewall thereof with a longitudinal groove 24d extending upward from the second oil supply hole 24b for allowing the steel ball 50F to move therein for axial positioning of the check valve 40G.

Other features of the eighth embodiment are the same as those of the first embodiment, and further details of the eighth embodiment will be omitted by simply denoting like elements by like reference numerals as in the first embodiment.

During operation the check valve 40G (steel ball 50) is pushed out of the second oil supply hole 24b by the pressurized hydraulic oil led from the oil gallery 32 to the second oil supply hole 24b, and moved upward in the body 24, thereby opening the second oil supply hole 24b. The pressurized oil flows from the open oil supply hole 24b into the annular communication passage T. On the other hand, if the engine is stopped, the pressure of oil urging the check valve 40G (steel ball 50) in the upward direction disappears, and the check valve 40G (steel ball 50) falls down in the longitudinal groove 24d under own weight to its original position in the second oil supply hole 24b and closes the second oil supply hole 24b.

The outer surface of the steel ball 50 then engages the stepped section 24b1 formed in the second oil supply hole 24b. However, since its movement is limited within the longitudinal groove 24d by the longitudinal groove 24d if subjected to the pressurized hydraulic oil. Thus, groove 24d functions as axial and circumferential positioning means for the check valve relative to the second oil supply hole 24b and ensures proper long-term opening/closing valve operation of the ball 50.

Since the check valve 40G consists of a single steel ball 50 and since the axial and longitudinal positioning means consists of a simple longitudinal groove 24d, the lash adjuster of the eighth embodiment is structurally very simple.

Although it has been shown in the eighth embodiment that the check valve 40G consists only of one steel ball 50, it would be understood that the check valve 40G may have a multiplicity of similar steel balls 50 distributed in similar longitudinal grooves spaced apart at equal angular intervals in the circumferential direction. In such configuration, the multiple steel balls 50 can simultaneously control the multiple second oil supply holes 24b that hydraulic oil is supplied smoothly to the reservoir 28 not only when the engine is in operation but also when it is stopped.

INDUSTRIAL UTILITY OF THE INVENTION

The valve actuation mechanisms of internal combustion engines, including automobile engines, are subjected to repeated frictions and thermal stresses during operation, which result in a change in valve gap. A hydraulic lash adjuster is a well known means for properly compensating for such change in valve gap. A hydraulic lash adjuster of the invention is suited for this purpose, especially for use with a valve actuation mechanism of an automobile internal combustion engine.

SYMBOLS 10 cylinder head
17 rocker arm
20 hydraulic lash adjuster
22 body of lash adjuster
23 push spring
24 cylinder body
24b second oil supply hole(s) formed in the sidewall of the body
T annular communication passage
24c circumferential groove for constituting annular communication passage
24d longitudinal groove serving as a means for positioning a steel ball in the circumferential direction
25a check ball serving as a check valve
26 plunger
26A upper portion of plunger
26B lower portion of plunger
27a first oil supply hole formed in sidewall of plunger
27b small hole 27d circumferential groove serving as annular communication passage
28 reservoir
29 high pressure chamber (pressure oil chamber)
30 lash adjuster mounting bore
32 oil gallery (external oil supply line)
40A-40G check valves
42 leaf-spring type check valve
43 engagement protrusion(s) to be engaged with oil supply hole(s)
50 steel ball serving as a check valve

The invention claimed is:

1. A hydraulic adjuster for use with an internal combustion engine including: a cylindrical body having an open upper end, a closed bottom, and a second oil supply hole formed in the sidewall of the cylindrical body; and a plunger having an upper end serving as a plunging end, a sidewall having a first oil supply hole, and a high pressure chamber at the bottom of the plunger, the plunger being slidable on the inner wall of the body and provided with a reservoir communicated with an external oil supply line via the first oil supply hole of the plunger and via the second oil supply hole of the body and provided with a small hole for connecting the reservoir with the high pressure chamber, the high pressure chamber including a check ball adapted to open and close the small hole in response to a rise and a fall of the oil pressure in the high pressure chamber and including a spring for urging the plunger in the longitudinal direction of the plunger, the hydraulic lash adjuster characterized in that:

the first and second oil supply holes are communicated with each other through an annular communication passage formed between the sidewalls of the plunger and the body;

a check valve is provided in the annular communication passage in association with the second oil supply hole, the check valve adapted to open/close the second oil supply hole in accordance with the pressure of the oil supplied from an external oil supply line to the second oil supply hole;

the annular communication passage is a circumferential groove formed in the inner surface of the sidewall of the body;

the check valve is a belt-shaped leaf spring adapted to abut against the bottom face of the circumferential groove; and the check valve has an engagement protrusion for engaging the second oil supply hole for axial and circumferential positioning of the leaf spring in association with the second oil supply hole.

2. The hydraulic lash adjuster for an internal combustion engine according to claim 1, wherein:

the body is provided with a further second oil supply hole similar to the one provided in the body such that the multiple second oil supply holes are spaced apart at equal angular intervals along a circumference of the sidewall of the body; and the leaf spring is provided with the same multiplicity of engagement protrusions as the second oil supply holes to fit in the respective second oil supply holes.

3. The hydraulic lash adjuster according to claim 2, wherein the leaf spring is provided with slits in the opposite sides of said at least one engagement protrusion to regulate the resiliency (inverse of the spring constant) of the region of the leaf spring surrounding that engagement protrusion.

4. The hydraulic lash adjuster according to claim 1, wherein the leaf spring is provided with slits in the opposite sides of said at least one engagement protrusion to regulate the resiliency (inverse of the spring constant) of the region of the leaf spring surrounding that engagement protrusion.

5. A hydraulic lash adjuster for an internal combustion engine including: a cylindrical body having an open upper end, a closed bottom, and a second oil supply hole formed in the sidewall of the cylindrical body; and a plunger having an upper end serving as a plunging end, a sidewall having a first oil supply hole, and a high pressure chamber at the bottom of the plunger, the plunger being slidable on the inner wall of the body and provided with a reservoir communicated with an external oil supply line via the first oil supply hole of the plunger and the second oil supply hole of the body and provided with a small hole for connecting the reservoir with the high pressure chamber, and the high pressure chamber including a check ball adapted to open/close the small hole in response to a rise and a fall of the oil pressure in the high pressure chamber, and including a spring for urging the plunger in the longitudinal direction of the plunger, the hydraulic lash adjuster characterized in that:

the first and second oil supply holes is communicated with each other through an annular communication passage formed between the sidewalls of the plunger and the body;

a check valve is provided in the annular communication passage in association with the second oil supply hole, the check valve adapted to open/close the second oil supply hole in accordance with the pressure of the oil supplied from an external oil supply line to the second oil supply hole;

the annular communication passage is a circumferential groove formed in the outer surface of the sidewall of the plunger;

the check valve is a ball that is movable in the circumferential groove and has a larger specific gravity than the hydraulic oil and an outer surface adapted to partially engage the second oil supply hole; and a longitudinal groove extending upward from the second oil supply hole is formed in the inner surface of the sidewall of the body to allow the movement of the ball therein to achieve proper axial and circumferential positioning of the ball relative to the second oil supply hole.

\* \* \* \* \*